United States Patent
Noh

(10) Patent No.: US 7,671,876 B2
(45) Date of Patent: Mar. 2, 2010

(54) RESOLUTION SCALER USING A DECIMAL PART OF AN ACCUMULATOR OUTPUT AS A WEIGHT FOR GENERATING SCALED PIXEL DATA

(75) Inventor: Jai-Seung Noh, Chungcheongbuk-do (KR)

(73) Assignee: Magnachip Semiconductor, Ltd. (KR)

( * ) Notice: Subject to any disclaimer, the term of this patent is extended or adjusted under 35 U.S.C. 154(b) by 913 days.

(21) Appl. No.: 11/217,559

(22) Filed: Aug. 31, 2005

(65) Prior Publication Data

US 2006/0044573 A1 Mar. 2, 2006

(30) Foreign Application Priority Data

Aug. 31, 2004 (KR) .................. 10-2004-0069225

(51) Int. Cl.
*G09G 5/02* (2006.01)
(52) U.S. Cl. ...................... 345/698; 358/1.2
(58) Field of Classification Search ......... 345/690–699, 345/204–215, 3.3–3.4, 30–111; 315/169.1–169.4; 358/1.2
See application file for complete search history.

(56) References Cited

U.S. PATENT DOCUMENTS

| | | | |
|---|---|---|---|
| 6,219,020 B1 * | 4/2001 | Furuhashi et al. | 345/100 |
| 2003/0184675 A1 * | 10/2003 | Campisano et al. | 348/445 |
| 2003/0195908 A1 * | 10/2003 | Cheng | 708/290 |
| 2004/0046773 A1 * | 3/2004 | Inoue et al. | 345/698 |
| 2006/0044573 A1 * | 3/2006 | Noh | 358/1.2 |

* cited by examiner

*Primary Examiner*—Chanh Nguyen
*Assistant Examiner*—Long Pham
(74) *Attorney, Agent, or Firm*—Blakely, Sokoloff, Taylor & Zafman

(57) ABSTRACT

A resolution scaler of the present invention uses a shift adder instead of a multiplier for scaling an input resolution. The resolution scaler is provided with a counter controller and a pixel scaler. The counter controller outputs a weight to the pixel scaler. The pixel scaler includes a first shift adder for outputting the first shift value by adding a plurality of first shift arguments generated by shifting the current pixel data, a second shift adder for outputting the second shift value by adding a plurality of second shift arguments generated by shifting the previous pixel data, and an adder for outputting the scaled pixel data by adding the first shift value and the second shift value.

6 Claims, 4 Drawing Sheets

INITIAL VALUE : 00H
COEFFICIENT : 1.49H

| IN_COUNT | 0 | 1 | 2 | 3 | 4 | 5 | 6 | 7 | 8 | 9 |
|---|---|---|---|---|---|---|---|---|---|---|

| INT_COUNT | 0 | 1 | 2 | 3 | 5 | 6 | 7 | 9 |
|---|---|---|---|---|---|---|---|---|

| DEC_COUNT | 0 | 49H | 92H | DBH | 24H | 6DH | B6H | 00H |
|---|---|---|---|---|---|---|---|---| ical part of an accumulator output as a weight for generating scaled pixel data

RESOLUTION SCALER USING A DECIMAL PART OF AN ACCUMULATOR OUTPUT AS A WEIGHT FOR GENERATING SCALED PIXEL DATA

FIELD OF INVENTION

The present invention relates to a resolution scaler for use in a digital display device; and, more particularly, to a resolution scaler for scaling an image signal having a predetermined resolution into a new image signal having a lower resolution which is lower than the predetermined resolution.

DESCRIPTION OF PRIOR ART

An amount of frame data displayed at every frame of a digital display device such as a cathode ray tube (CRT) and a liquid crystal display (LCD) is corresponding to a predetermined resolution. For example, if a resolution of a digital display device is 640×480, one frame data is constituted with 307,200 numbers of pixel data.

Generally, a frame data outputted to a display device is provided with a predetermined resolution of the display device. However, in some cases, the resolution of the display device is lower or higher than that of the frame data.

Though the resolution of the frame data is higher than that of the display device, it is easy to solve a resolution difference between the frame data and the display device if the resolution of the frame data is multiple of the resolution of the display device. For example, when a frame data having 640× 480 resolution is outputted to a display device having 320× 240 resolution, the frame data can be displayed to the display device by outputting every even pixel data or outputting every odd pixel data of the frame data.

On the other hand, when the resolution of the frame data is not multiple of the resolution of the display device and, more particularly, a difference between the resolutions of the frame data and the display device is minute, it is difficult to display the frame data having the high resolution on the display device having the low resolution.

In order to make possible to display the frame data having the high resolution on the display device having the low resolution, a new frame data having the low resolution of the display device is formed by using a resolution scaler. Herein, the resolution scaler generates the low resolution by multiplying the pixel data of the original frame data by a predetermined weight and adding each two neighboring pixel data.

FIG. 1 is a block diagram describing a conventional resolution scaler.

As shown, the conventional resolution scaler is provided with a counter controller 10 and a pixel scaler 20. The counter controller 10 outputs a first weight AM to the pixel scaler 20. The pixel scaler 20 actually performs a resolution scaling operation.

FIG. 2 is a block diagram depicting the pixel scaler shown in FIG. 1.

As shown, the pixel scaler 20 includes a first and a second input registers 22 and 24, a first and a second multiplier 26 and 28, and an adder 29.

The first input register 22 receives an original pixel data DN to thereby store a current pixel data; and the second input register 24 stores a previous pixel data transferred through the first input register 22. The first multiplier 26 multiplies the current pixel data by a first weight AM. The second multiplier 28 multiplies the previous pixel data by a second weight (1−AM). The adder 29 adds outputs from the first and the second multiplier 26 and 28 to thereby output a converted pixel data RN.

As abovementioned, the second weight (1−AM) is generated by subtracting the first weight AM from '1'. The pixel scaler 20 receives the first and the second weights AM and (1−AM) to thereby generate the converted pixel data RN.

Meanwhile, the conventional resolution scaler uses two multipliers 16 and 18 for generating one pixel data. However, the multiplier occupies a large space and, further, is very expensive. Moreover, the multiplying operation takes more time than the other operations.

SUMMARY OF INVENTION

It is, therefore, an object of the present invention to provide a resolution scaler having high operational speed and reducing a hardware size and implementing cost.

In accordance with an aspect of the present invention, there is a resolution scaler including a first input register for storing a current pixel data, a second input register for storing a previous pixel data, and a shift adding block for outputting a scaled pixel data by adding a first shift value obtained by shifting the current pixel data and a second shift value obtained by shifting the previous pixel data. Herein, the shift adding block includes a first shift adder for outputting the first shift value by adding a plurality of first shift arguments generated by shifting the current pixel data, a second shift adder for outputting the second shift value by adding a plurality of second shift arguments generated by shifting the previous pixel data, and an adder for outputting the scaled pixel data by adding the first shift value and the second shift value.

In accordance with an aspect of the present invention, there is a resolution scaler including an input register for storing the N numbers of continuous input pixel data, an M numbers of shift adding blocks for outputting a scaled pixel data by adding a first shift value generated by shifting a first input pixel data stored in the input register and a second shift value generated by shifting a second input pixel data stored in the input register, wherein the first and the second pixel data are adjacent and N and M are natural numbers.

BRIEF DESCRIPTION OF THE DRAWINGS

The above and other objects and features of the present invention will become apparent from the following description of preferred embodiments taken in conjunction with the accompanying drawings, in which.

DETAILED DESCRIPTION OF INVENTION

Hereinafter, a resolution scaler in accordance with the present invention will be described in detail referring to the accompanying drawings.

In order to reduce problems caused by use of a multiplier, the present invention proposes a resolution scaler without using the multiplier. The resolution scaler according to the present invention is provided with a counter controller 100 and a pixel scaler 200.

Figure 1:
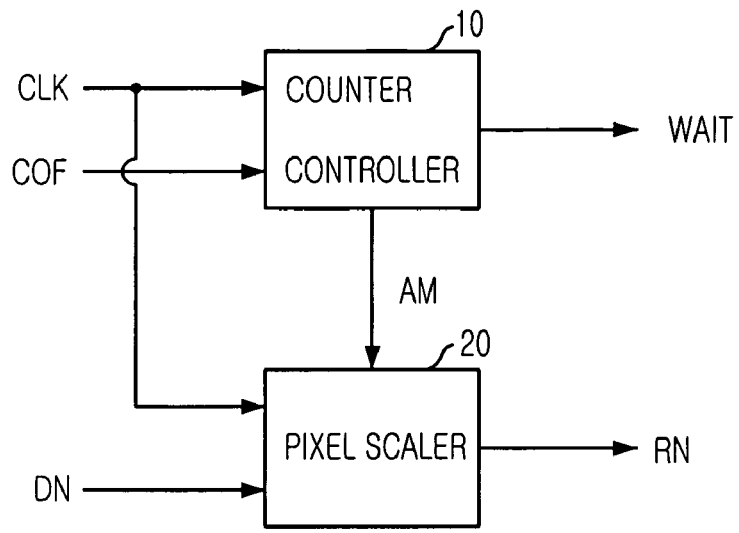
FIG. 1 is a block diagram describing a conventional resolution scaler.
Figure 2:
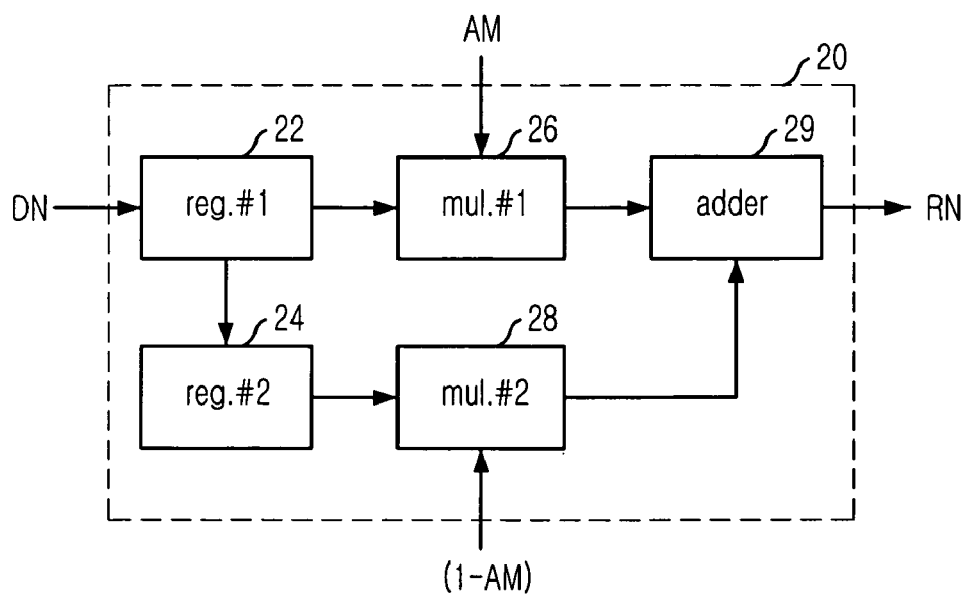
FIG. 2 is a block diagram depicting a pixel scaler shown in FIG. 1.
Figures 3, 4:
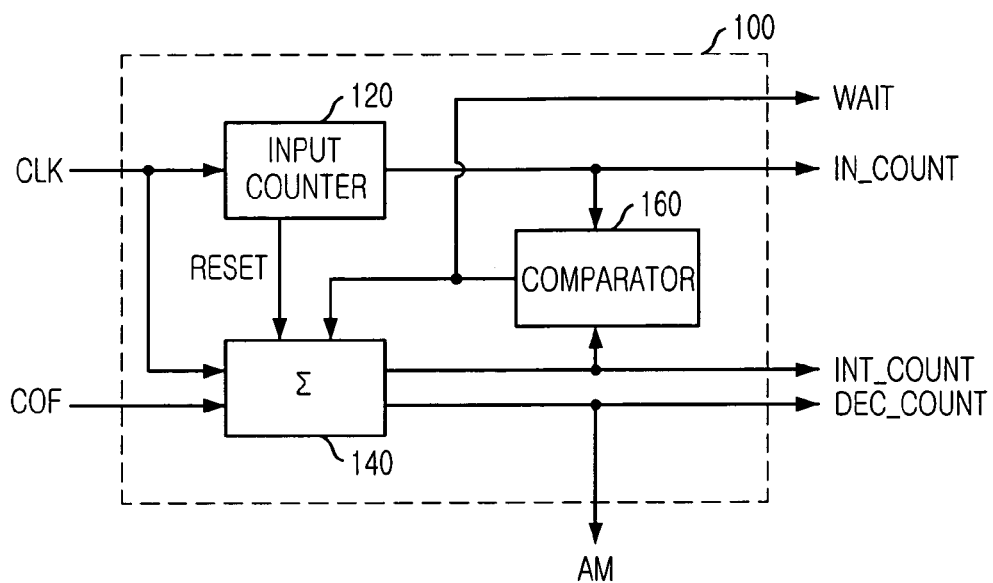
FIG. 3 is a block diagram describing a counter controller for use in a resolution scaler in accordance with an embodiment of the present invention.
FIG. 4 is a diagram demonstrating an operation of the counter controller shown in FIG. 3 where the original frame data has a 720 horizontal resolution and a scaled frame data has a 560 horizontal resolution.

FIG. 3 is a block diagram describing the counter controller 100 for use in the resolution scaler in accordance with an embodiment of the present invention. As shown, the counter controller 100 includes an input counter 120, an accumulator 140, and a comparator 160.

The input counter 120 receives a reference clock CLK to thereby output an input count IN_COUNT and a reset signal RESET inputted to the accumulator 140. The input count IN_COUNT is increased at every input of the reference clock CLK and indicates a line position of the pixel data which will be outputted. The reference clock CLK is used as a timing reference for the resolution scaler as well as a counting clock for the input counter 120. In other words, the reference clock CLK is used as a latch and output reference signal for the first and the second input registers 210 and 220 and used as a driving reference signal for the accumulator 140 and the comparator 160.

The accumulator 140 sums up a coefficient COF at every input of the reference clock CLK. The coefficient COF is determined based on resolutions of inputted frame data and a display device. A cumulative value calculated in the accumulator 140 is outputted after being divided into an integer part INT_COUNT and a decimal part DEC_COUNT. Herein, the decimal part DEC_COUNT outputted from the accumulator 140 is used as the first weight AM inputted to the pixel scaler 200.

The comparator 160 compares the input count IN_COUNT with the integer part INT_COUNT. If the input count IN_COUNT and the integer part INT_COUNT is different, the comparator 160 outputs an activated wait signal WAIT. The wait signal WAIT is inputted to the accumulator 140 to thereby hold an accumulation operation of the accumulator 140 while the wait signal WAIT is activated. This can be easily implemented by using logic gates. The wait signal WAIT is also inputted to units participating to perform a process for displaying the pixel data on the display device to thereby make the units hold the display of pixel data for a period corresponding to the input count IN_COUNT.

FIG. 4 is a diagram demonstrating an operation of the counter controller 100 shown in FIG. 3, where the original frame data has a 720 horizontal resolution and a scaled frame data has a 560 horizontal resolution.

Because the resolution scaler receives the original frame data in response to the reference clock CLK, it takes 720 reference clock periods for the resolution scaler to outputs scaled pixel data converted from the original pixel data. In other words, the resolution scaler outputs 560 numbers of scaled pixel data during 720 periods of the reference clock CLK. Thus, it takes 720/560, i.e., about 1.2857, reference clock period for the resolution scaler to output each scaled pixel data.

However, it is almost impossible to make the digital circuit operate in response to above real number period. Thus, if 7 numbers of pixel data is outputted during 9 reference clock periods instead of 720/560 periods, an average reference clock period for outputting one pixel data can become about 1.2857 reference clock period. The counter controller 100 controls the average reference clock period for outputting one pixel data in response to an appropriate coefficient COF. The coefficient COF inputted to the accumulator 140 is a hexadecimal number "1.49H" corresponding to a decimal number "1.2857" when the resolution scaler outputs 7 scaled pixel data during 9 reference clock periods.

Referring to FIG. 4, before the reference clock CLK is inputted to the counter controller 100, an initial value of the cumulative value stored in the accumulator 140 is a hexadecimal number "00H". After a first reference clock CLK is inputted, the input count IN_COUNT becomes "1". Because "1.2857", i.e., a hexadecimal number "1.49H", is inputted to the accumulator 140 as the coefficient COF, the cumulative value becomes "1.2857". Thus, the integer part INT_COUNT becomes "1" and the decimal part DEC_COUNT becomes "2857", i.e., a hexadecimal value "49H". In this way, the coefficient COF of "1.2857" is added to the cumulative number stored in the accumulator 140 in response to the reference clock CLK and, therefore, the integer part INT_COUNT and the decimal part DEC_COUNT are increased.

Meanwhile, when a fourth reference clock is inputted to the input counter 120, the input count IN_COUNT becomes "4" and the cumulative value becomes "1.2857×4=5.1429". Therefore, the integer part INT_COUNT becomes "5" and the decimal part DEC_COUNT becomes "1429", i.e., a hexadecimal value "24H". In this case, the input count IN_COUNT and the integer part INT_COUNT are different. Thus, the comparator 160 activates the wait signal WAIT.

When a fifth reference clock CLK is inputted, the input count IN_COUNT becomes "5". Because the accumulator 140 does not perform an adding operation, the integer count INT_COUNT holds "5" and the decimal count DEC_COUNT holds "24H". Because the input count IN_COUNT and the integer part INT_COUNT have the same value "5", the comparator 160 deactivates the wait signal WAIT.

In case when a sixth and a seventh reference clocks CLK are inputted, the accumulator 140 performs the accumulation operation because the wait signal WAIT is inactivated. Therefore, after the seventh reference clock CLK is inputted, the cumulative value stored in the accumulator 140 is "7.7413".

Subsequently, an eighth reference clock CLK is inputted, the input count IN_COUNT becomes "8" and the cumulative value becomes "7.7413+1.2857=9". Therefore, the integer part INT_COUNT is "9" and the decimal part DEC_COUNT becomes "0". Herein, the input count IN_COUNT and the integer part INT_COUNT are different. Thus, the accumulator 140 activates the wait signal WAIT.

When a ninth reference clock CLK is inputted, the accumulator 140 does not perform the adding operation in response to the activated wait signal WAIT. Therefore, the integer part INT_COUNT holds "9" and the decimal part DEC_COUNT also holds "0".

From a tenth reference clock CLK, the abovementioned process is repeated. That is, seven weight values, i.e., from "49H" to "00H", for the nine input pixel data DN1 to DN9 are repeated continuously.

As abovementioned, the counter controller 100 outputs 7 decimal parts DEC_COUNT, in other words, 7 weights AM to the pixel scaler 200.

Figure 5:
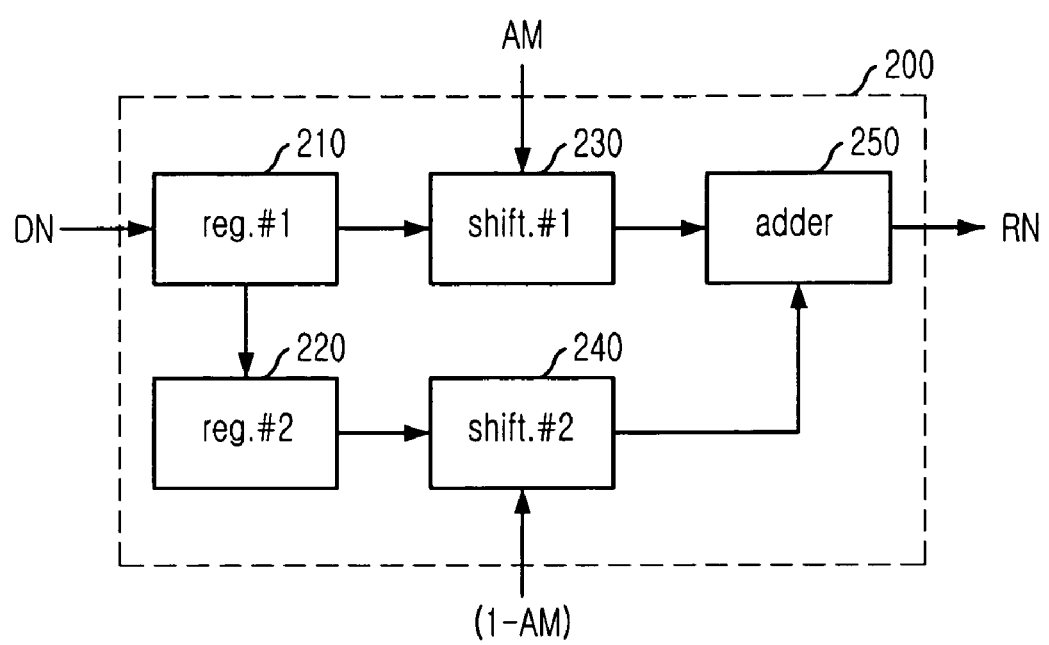
FIG. 5 is block diagram depicting a pixel scaler used in the resolution scaler of the present invention.

FIG. 5 is block diagram depicting the pixel scaler 200 used in the resolution scaler of the present invention.

As shown, the pixel scaler 200 is provided with a first and a second input registers 210 and 220, a first and a second shift adders 230 and 240, and an adder 250.

The first input register 210 receives an input pixel data DN constituting the original frame data to thereby store a current pixel data. The second input register 220 stores a previous pixel data inputted through the first input register 210. The first shift adder 230 generates more than one shift values to thereby generate a first approximation weight SM by shifting the current pixel value as many as shift counts and summing up the shift values. The second shift adder 240 generates more than one shift values to thereby output a second approximation weight SM' by shifting the previous pixel values as many as shift counts and summing up the shift values. The adder 250 adds a first output to a second output outputted from the first shift adder 230 and the second shift adder 240, respectively, to thereby generate the scaled pixel data RN.

The original frame data are inputted to the resolution scaler in a stream format constituting with a plurality of the input pixel data DN. Each of the input pixel data DN is inputted to the first input register 210 in response to the reference clock CLK. In detail, a first input pixel data is inputted to the first input register 210 in response to a first reference clock CLK. Then, in response to a second reference clock CLK, the first input pixel data stored in the first input register 210 is moved into the second input register 220 as the previous pixel data and a second input pixel data is inputted to the first input register 210 as the current pixel data.

Then, the current pixel data stored in the first input register 210 is inputted to the first shift adder 230 and the previous pixel data stored in the second input register 220 is inputted to the second shift adder 240. The first and the second shift adders 230 and 240 shift the inputted pixel data as many as the shift counts respectively.

Tables 1A to 2B shows the shift counts where the original frame data has a 720 horizontal resolution and a scaled frame data has a 560 horizontal resolution.

TABLE 1A

| | | SHIFT COUNT | | |
|---|---|---|---|---|
| M | AM | 1SHIFT | 2SHIFT | SM |
| 1 | 0.49H |  | 0.4H | 0.4H |
| 2 | 0.92H | 0.8H |  | 0.8H |
| 3 | 0.DBH | 0.8H | 0.4H | 0.CH |
| 4 | 0.24H |  | 0.4H | 0.4H |
| 5 | 0.6DH | 0.8H |  | 0.8H |
| 6 | 0.B6H | 0.8H | 0.4H | 0.CH |
| 7 | 00H |  |  | 00H |

TABLE 1B

| | | SHIFT COUNT | | |
|---|---|---|---|---|
| M | 1-AM | 1SHIFT | 2SHIFT | SM' |
| 1 | 0.B7H | 0.8H | 0.4H | 0.CH |
| 2 | 0.6EH | 0.8H |  | 0.8H |
| 3 | 0.25H |  | 0.4H | 0.4H |
| 4 | 0.DCH | 0.8H | 0.4H | 0.CH |
| 5 | 0.93H | 0.8H |  | 0.8H |
| 6 | 0.4AH |  | 0.4H | 0.4H |
| 7 | 1.0H |  |  | 1.0H |

TABLE 2A

| | | SHIFT COUNT | | | | | |
|---|---|---|---|---|---|---|---|
| M | AM | 1SHIFT | 2SHIFT | 3SHIFT | 4SHIFT | 5SHIFT | SM |
| 1 | 0.49H |  | 0.4H |  |  | 0.08H | 0.48H |
| 2 | 0.92H | 0.8H |  |  | 0.1H |  | 0.9H |
| 3 | 0.DBH | 0.8H | 0.4H |  | 0.1H | 0.08H | 0.D8H |

TABLE 2A-continued

| | | SHIFT COUNT | | | | | |
|---|---|---|---|---|---|---|---|
| M | AM | 1SHIFT | 2SHIFT | 3SHIFT | 4SHIFT | 5SHIFT | SM |
| 4 | 0.24H |  |  | 0.2H |  |  | 0.2H |
| 5 | 0.6DH |  | 0.4H | 0.2H |  | 0.08H | 0.68H |
| 6 | 0.B6H | 0.8H |  | 0.2H | 0.1H | 0.08H | 0.B8H |
| 7 | 00H |  |  |  |  |  | 00H |

TABLE 2B

| | | SHIFT COUNT | | | | | |
|---|---|---|---|---|---|---|---|
| M | 1-AM | 1SHIFT | 2SHIFT | 3SHIFT | 4SHIFT | 5SHIFT | SM' |
| 1 | 0.B7H | 0.8H |  | 0.2H | 0.1H |  | 0.B0H |
| 2 | 0.6EH |  | 0.4H | 0.2H |  | 0.08H | 0.68H |
| 3 | 0.25H |  |  | 0.2H |  |  | 0.2H |
| 4 | 0.DCH | 0.8H | 0.4H |  | 0.1H | 0.08H | 0.D8H |
| 5 | 0.93H | 0.8H |  |  | 0.1H |  | 0.9H |
| 6 | 0.4AH |  | 0.4H |  |  | 0.08H | 0.48H |
| 7 | 1.0H |  |  |  |  |  | 1.0H |

Herein, 'M' denotes an order of the scaled pixel data. For example, when 'M' is '1', it indicates a case of a first scaled pixel data RN1. The detailed explanation about Tables 1A to 2B will be explained later.

Figure 6:
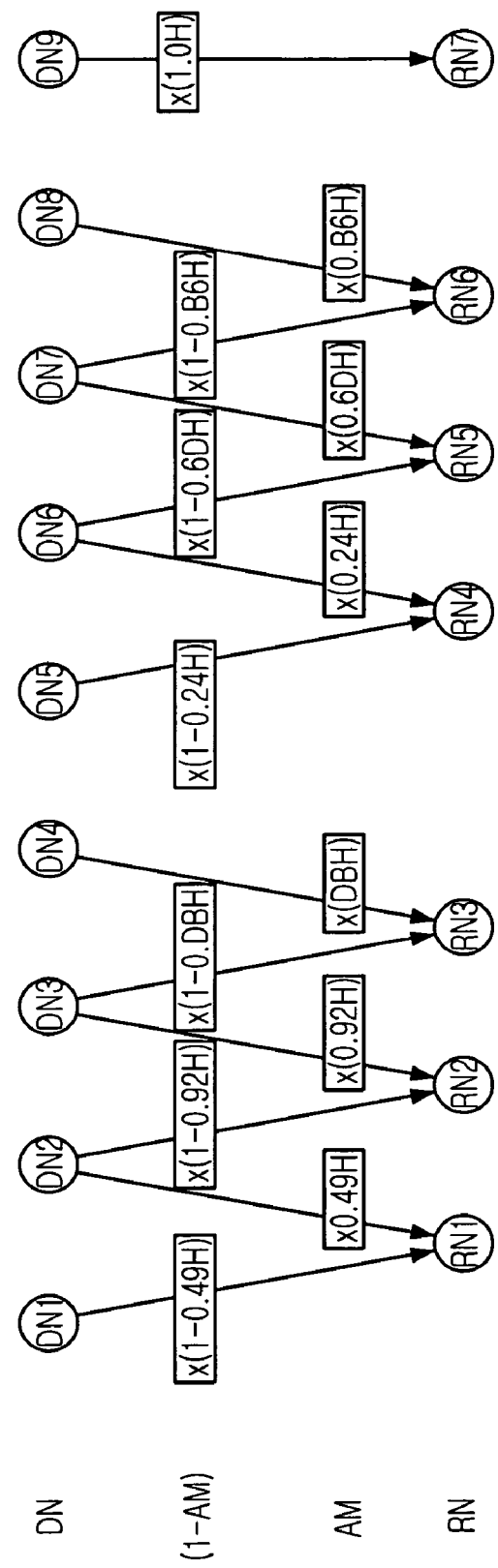
FIG. 6 is a diagram demonstrating an operation of the pixel scaler shown in FIG. 5 where the original frame data has a 720 horizontal resolution and a scaled frame data has a 560 horizontal resolution.

FIG. 6 is a diagram demonstrating an operation of the pixel scaler 200 shown in FIG. 5 where the original frame data has a 720 horizontal resolution and a scaled frame data has a 560 horizontal resolution.

It can be considered that the seven scaled pixel data RN1 to RN7 in the 560 horizontal resolution are converted from the nine input pixel data DN1 to DN9 in the 720 horizontal resolution. In the present invention, a first scaled pixel data RN1 displayed on the first pixel of the display device is formed by adding 0.2857 of a second input pixel data DN2 to (1−0.2857) of a first input pixel data DN1. That is, RN1= (0.7143)RN1+(0.2857)RN2. Herein, the first weight AM of 0.2857 and the second weight (1−AM) of 0.7143 are outputted from the count controller 100. In this way, the seven scaled pixel data RN1 to RN7 are generated by the pixel scaler 200.

Meanwhile, the present invention uses the first and the second approximation weights SM and SM'. Tables 1A to 2B record the approximation weights SM and SM', each used for the first and the second shift adders 230 and 240. Tables 1A and 1B show the case when the first and the second shift adders 230 and 240 respectively perform two steps of shift operations. Further, tables 2A and 2B show the case when the first and the second shift adders 230 and 240 perform five steps of shift operations.

Hereinafter, an operation of the first shift adder 230 and 240 is explained by taking tables 2A and 2B for an example.

For generating the first scaled pixel data RN1, the first shift adder 230 generates the first approximation weight SM corresponding to the first weight AM, 0.2857. The value "0.2857" can be expressed as "0.25+0.03125+0.00445". The value "0.25" is obtained by performing right-shift operation twice and the value "0.03125" is obtained by performing right-shift operation 5 times. The first shift adder 230 generates the first approximation weight SM, 0.28125, by adding the two values "0.25" and "0.03125". That is, the first shift adder 230 performs two right-shifting operations and one adding operation to thereby generate the first approximation weight SM. Therefore, one adder is required for generating the first approximation weight SM, 0.28125.

Herein, there exists an error of about 0.00445, i.e., 0.6%, between the first weight AM, 0.2857, and the first approximation weight SM, 0.28125. However, the error does not cause the serious degradation of the display device.

The second shift adder 240 generates the second approximation weight SM' corresponding to the second weight (1−AM), about 0.7143, in the same way with the first shift adder 230 for generating the first scaled pixel data RN1. The value "0.7143" is also considered as "0.5+0.125+0.0625+ 0.0268". The value "0.5" is obtained by performing the right-shift operation just once. Further, the values "0.125" and "0.0625" are obtained by performing the right-shift operations respectively. The second shift adder 240 generates the second approximation weight SM' of 0.6875 by performing three right-shift operations and two adding operations. Therefore, in order to generate the second approximation weight SM', 0.6875, for the first scaled pixel data RN1, two adders are required.

In this way, total 24 adders are required for generating the seven scaled pixel data RN1 to RN7 when the shift adders 230 and 240 perform the right-shit operations according to tables 2A and 2B. Meanwhile, 10 adders are required for generating the seven scaled pixel data RN1 to RN7 when the shift adders 230 and 240 perform the right-shift operations according to tables 1A and 1B. However, when the first and the second weights AM and (1−AM) are applied to generate the seven scaled pixel data RN1 to RN7, 44 adders are required.

As abovementioned, the present invention remarkably reduces the number of adders by properly treating the weight AM. Therefore, the present invention also reduces the space required for the resolution scaler and costs much less expense.

In the abovementioned embodiment of the present invention, only one pixel scaler 200 is included. Therefore, the seven scaled pixel data RN1 to RN7 are outputted sequentially.

However, in an other embodiment of the present invention, seven numbers of the pixel scalers 200 is included. Each of the pixel scalers 200 is dedicated for each of the scaled pixel data RN1 to RN7. In other words, the pixel scalers 200 receive the constant first and second weights AM and (1−AM). For example, the pixel scaler 200 which generates the first scaled pixel data RN1 always receives "2857" as the first weight AM and "7143" as the second weight (1−AM).

Therefore, in the embodiment including a plurality of the pixel scalers 200, the counter controller 100 and above described tables for referring the weight AM are not required. Thus, the operational speed becomes more faster.

The resolution scaler of the present invention obtains a high operational speed by performing the pixel scaling without multiplier. Further, the size of the resolution scaler of the present invention is remarkably reduced as compared with the conventional resolution scaler with multipliers and, therefore, the cost for implementing the resolution scaler of the present invention is dramatically reduced.

The present application contains subject matter related to Korean patent application No. 2004-69225, filed in the Korean Patent Office on Aug. 31, 2004, the entire contents of which being incorporated herein by reference.

While the present invention has been described with respect to the particular embodiments, it will be apparent to those skilled in the art that various changes and modifications may be made without departing from the spirit and scope of the invention as defined in the following claims.

What is claimed is:

1. A resolution scaler, comprising:
   a counter controller for outputting a weight adjusted by a reference clock and a coefficient; and
   a pixel scaler for receiving the reference clock, the weight, and an input pixel data to output a scaled pixel data by shifting and adding the input pixel data according to a weight table,
   wherein the counter controller includes:
   an input counter for receiving the reference clock to thereby output an input count;
   an accumulator for adding the coefficient to a cumulative value when a wait signal is not activated to thereby separately output an integer part of the cumulative value and a decimal part of the cumulative value; and
   a comparator for comparing the input count with the integer part to thereby activate the wait signal when the input count and the integer part are different, and to deactivate the wait signal when the input count and the integer part are the same, and
   wherein the pixel scaler includes:
   a first shift adder for receiving the decimal part as the weight to thereby output a first shift value by adding a plurality of first shift arguments generated by shifting the weight to the first input pixel data;
   a second shift adder for receiving a second weight to thereby output a second shift value by adding a plurality of second shift arguments generated by shifting the second weight to the second input pixel data; and
   an adder for outputting the scaled pixel data by adding the first and the second shift values.

2. The resolution scaler as recited in claim 1, wherein the pixel scaler includes:
   a first input register for storing the current pixel data;
   a second input register for storing the previous pixel data; and
   a shift adding block for outputting the scaled pixel data by adding the first shift value obtained by shifting the current pixel data and the second shift value obtained by shifting the previous pixel data,
   wherein the current pixel data and the previous pixel data are the input pixel data neighboring each other.

3. The resolution scaler as recited in claim 2, wherein the shift adding block includes:
   an adder for outputting the scaled pixel data by adding the first shift value and the second shift value,
   wherein the second weight is obtained by subtracting the weight from 1.

4. The resolution scaler as recited in claim 3, wherein the weight table contains a first shift count applied for the current pixel data and a second shift count applied for the previous pixel count.

5. A resolution scaler, comprising:
   a means for outputting a weight in response to a reference clock and a coefficient; and
   an input register for storing the N numbers of continuous input pixel data;
   an M numbers of shift adding blocks for outputting a scaled pixel data by adding a first shift value generated by shifting a first input pixel data stored in the input register and a second shift value generated by shifting a second input pixel data stored in the input register,
   wherein the first and the second input pixel data are adjacent and N and M are natural numbers,
   wherein the means for outputting a weight includes:
   an input counter for receiving the reference clock to thereby output an input count;

an accumulator for adding the coefficient to a cumulative value when a wait signal is not activated to thereby separately output an integer part of the cumulative value and a decimal part of the cumulative value; and a comparator for comparing the input count with the integer part to thereby activate the wait signal when the input count and the integer part are different, and to deactivate the wait signal when the input count and the integer part are the same, and wherein each shift adding block includes:

a first shift adder for receiving the decimal part as the weight to thereby output the first shift value by adding a plurality of first shift arguments generated by shifting the weight to the first input pixel data;

a second shift adder for receiving a second weight to thereby output the second shift value by adding a plurality of second shift arguments generated by shifting the second weight to the second input pixel data; and an adder for outputting the scaled pixel data by adding the first and the second shift values.

6. The resolution scaler as recited in claim 5 having a relation of "resolution of the input pixel data: resolution of the scaled pixel data=N:M".

* * * * *